ic Valve

United States Patent [19]

Nicolaisen

[11] Patent Number: 5,054,742
[45] Date of Patent: Oct. 8, 1991

[54] MAGNETIC VALVE

[75] Inventor: Holger Nicolaisen, Nordborg, Denmark

[73] Assignee: Danfoss A/A, Nordborg, Denmark

[21] Appl. No.: 576,983

[22] Filed: Sep. 4, 1990

[30] Foreign Application Priority Data

Sep. 14, 1989 [DE] Fed. Rep. of Germany ....... 3930785

[51] Int. Cl.⁵ ............................................. F16K 31/06
[52] U.S. Cl. ............................ 251/129.19; 251/129.15
[58] Field of Search ....................... 251/129.19, 129.15

[56] References Cited

U.S. PATENT DOCUMENTS 2,651,744 9/1953 Acklin et al. ............... 251/129.19 X
4,790,346 12/1988 Kolze et al. ................. 251/129.19 X Primary Examiner—Arnold Rosenthal
Attorney, Agent, or Firm—Wayne B. Easton; Clayton R. Johnson

[57] ABSTRACT

The magnetic valve includes a magnetic coil, at least one valve seat, a valve shank surrounded by a valve plate member and movable upon energizing of the coil to move the surrounding valve plate member away from the valve seat to permit fluid flow therethrough, and a resetting spring for resiliently retaining the valve member in a position for blocking fluid flow through the valve seat when the coil is deenergized. The spring action acting upon the valve plate member moves the valve shank away from the coil upon denergization of the coil. The valve plate member is movable relative to the shank and includes an annular resilient metal plate that has radial inwardly extending teeth and a coating of elastic plastic sprayed on to the plate to leave at least part of the teeth uncoated. As a result the valve plate member is adaptable to unevenness of the valve seat for obtaining a tight sealing fit for blocking fluid flow while being adequately strong to transmit the necessary actuating forces and withstand fluid pressures without markedly bending. In the valve plate member fluid blocking position the valve seat opens to the plastic coating.

10 Claims, 2 Drawing Sheets

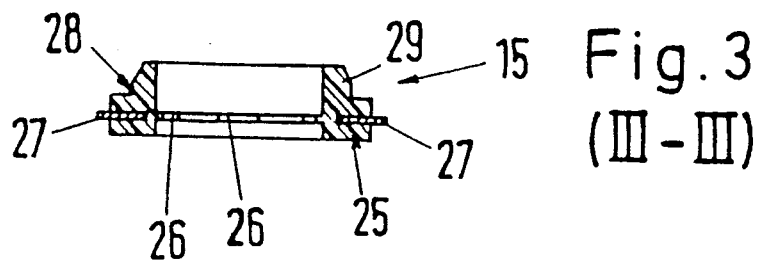
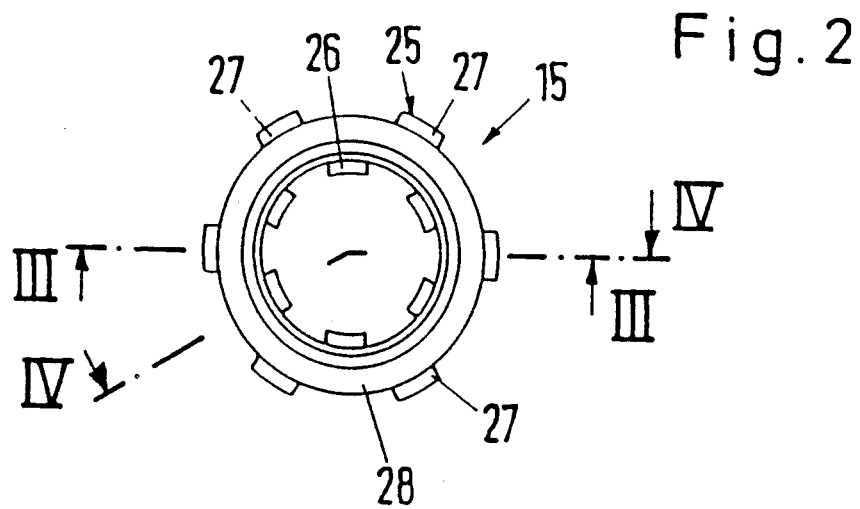
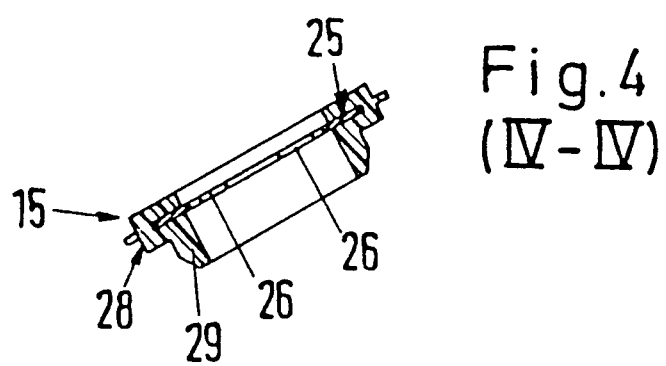
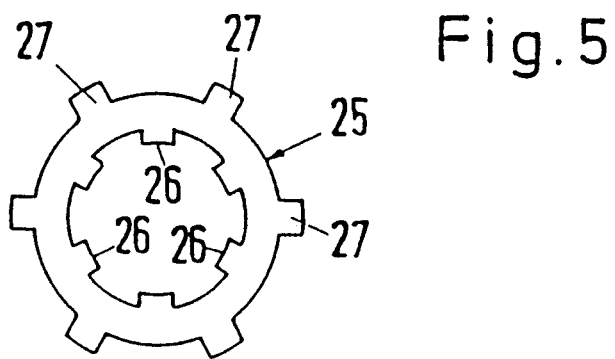

MAGNETIC VALVE

The invention relates to a magnetic valve comprising a magnet coil, a magnet armature which forms a valve shaft and can be displaced through the magnetic field of the armature, a valve plate surrounding the valve shaft, at least one valve seat and a resetting spring which holds the plate to the seat when the coil is switched off, forces acting on the valve plate being transmitted between same and the shaft.

In a known magnetic valve of this kind (DE-PS 34 41 251), the valve plate and the valve shaft or magnet armature are made in one piece from magnetically conductive material. Upon opening and closing of the valve, therefore, a comparatively large mass has to be moved, whereby an upper limit is set to the speed of response of the magnetic valve, especially when the magnetic valve is operated by electric pulses. There is also a danger that sealing of the valve seat by the valve plate is not adequate in the closed condition because hard materials cannot compensate surface roughness upon contact.

Valves are also known (DE-AS 12 18 242 and DE-AS 12 18 243) in which the valve shaft is positively connected to the valve plate and the latter is formed by a comparatively rigid supporting plate and a rubber-like material surrounding the supporting plate. However, this gives rise to difficulties in so far that steam can readily penetrate between the rubber-like material at the supporting plate and deform the valve plate. As a result, there is a defective seal in the closed position by reason of unevennesses of the valve plate. Replacement of the valve plate in case of wear of the rubber-like material causes difficulties because of the positive connection between the valve shaft and valve plate. It is possible that the valve shaft will also have to be replaced. This is wasteful of material and very costly, especially in the case of magnetically conductive material.

The invention is based on the problem of providing a magnetic valve of the aforementioned kind in which a better seal is produced in the closed position and more rapid actuation is possible, especially when operated by pulses.

According to the invention, this problem is solved in that the valve plate is made separate from the valve shaft and comprises an annular plate of resilient metal with teeth projecting at least at the inner edge of the annular plate and a coating of elastic plastics sprayed on to the plate to leave at least part of the teeth uncoated.

With this solution, an adequate seal is produced in the closed position because the elastic plastics in conjunction with the resilient flexibility of the thin annular plate, especially its teeth of smaller cross-section, more readily adapts to any unevennesses of the valve seat and/or more readily compensates for an oblique position of the valve plate because of tilting of the valve shaft, than does a rigid valve plate. Unevennesses of the valve plate on account of vapour occlusions between the supporting annular plate and the elastic plastics and any leaks brought about by this are likewise avoided because the exposed surfaces of the teeth permit escape of the steam occlusions to atmosphere. The teeth also ensure that, in the last phase of the closing or opening movement of the valve plate, a rubber elastic plastics is less readily sucked against the valve seat with an impact under the suction pressure (or against the suction pressure if the valve closes in the direction of flow) or remains sucked to the valve seat and is then suddenly lifted off. This would lift the coating from the annular plate on the side facing the valve seat and at the same time also stretched on the other side of the annular plate without the teeth and pulled around both edges of the annular plate, which is prevented by the teeth at the radially inner edge of the plate. The coating is radially narrower than without the teeth, the internal and external diameter of the annular plate remaining the same. There is therefore less coating material available for lifting off. The sudden closing or opening would bring about audible liquid "knocking" in the connected conduit system. The exposed areas of the teeth of the annular plate may serve to transmit the opening and closing forces during assembly of the valve plate and during operation of the magnetic valve. Spraying on of the elastic plastics, which is preferably a thermo-plastic polymer with a comparatively high hardness in the region of about 40 to 63 Shore-D, preferably a thermoplastic polyester or chloroprene rubber with a higher resistance to refrigerant, is very rapid and simple to carry out. In addition, the valve plate and valve shaft together have a lower mass than if they were made in one piece from magnetically conductive material. The magnetic valve can therefore be opened and closed with a high actuating pulse frequency.

Preferably, the annular plate also has radially projecting teeth at the outer edge offset circumferentially relatively to the radially projecting teeth at the inner edge of the annular plate and at least parts of their surface are exposed. This gives an even better contact between the annular plate and the elastic plastics. Even in the case of swelling of the plastics because of a liquid flowing through the valve and resultant stretching of the coating material in the radial direction of the annular plate, the elastic coating is less readily pulled about the edges of the annular plate from the side remote from the valve seat by a suction pressure between the valve plate and valve seat on the side facing the valve seat and lifted from same. This is also because the radial width of the coating would become still less for the same internal and external diameter of the annular plate. Impact noises through sudden suction of the coating material to the valve seat or sudden lifting off during opening of the valve if the coating material had first remained sucked to the valve seat are thereby avoided to an even greater extent. At the same time, any vapour occlusions between the annular plate and the plastics can escape more readily (along the teeth) without bulging occurring in the elastic plastics material.

The magnetic valve is particularly suitable as a multinozzle valve in which a plurality of valve seats are disposed around the central axis of the valve plate that is perpendicular to the plain of the annular plate. Since no special retaining means are necessary for the elastic plastics material, the entire annular surface facing the valve seats is available as an abutment surface for the valve seats and tilting of the valve plate relatively to the valve seats is for the most part avoided, which is in contrast to only a single valve seat.

Provision may be made for a bushing to be secured around the valve shaft and to have a step with an abutment surface which is remote from the valve seat or valve seats and is for the marginal section of the annular plate that has the radially inner teeth. On the one hand, this facilitates replacement of the valve plate by pulling it off the valve shaft. On the other hand, one simultaneously ensures that the valve plate is pivotable about any transverse access of the valve shaft and can therefore adapt its position more readily to that of the valve seat or the valve seats. At the same time, the actuating force acting on the valve shaft is transmitted to the valve plate substantially by way of the radially inner teeth and vice versa.

The bushing may be seated on the one end section of the valve shaft and the other end section may form a damping piston which projects into a damping cylinder in an outlet chamber of a valve housing. In this way, one not only damps any abutment noises between the valve plate and valve seat upon sudden actuation of the magnetic valve but tilting of the valve shaft by reason of guiding in the damping cylinder is for the most part avoided, which contributes to a still better seal.

The damping cylinder may comprise an annular flange which projects radially from its mouth, bounds the outlet chamber and is traversed by nozzles that are each surrounded by a valve seat. In contrast with a separate construction of a plate carrying the valve seat and of the damping cylinder, one thereby dispenses with the production of the plate and damping cylinder to close tolerances for the purpose of the accurate axial assembly of both parts so as to avoid tilting of the valve plate and valve seats. At the same time, the valve plate may be disposed at a small spacing from the nozzle orifices, thereby avoiding bending of the valve plate and also impact-like pressure waves ("knocking") which make themselves noticeable as explosion sounds in the adjoining conduit system during opening and closing of the valve.

An air gap may be formed between an end face of a magnetic core which is surrounded by the magnet coil and adjustable therein in its axial position and an end face of the valve shank in its closed position forming the magnet armature. The axial adjustability of the magnetic core permits one to set an accurately dimensioned air gap so that an optimum magnetic force is produced. At the same time, the armature stroke is thereby accurately defined and can be set to be so small so that, in the lifted position, the valve plate will not affect the flow through the nozzles. Preferably, the length of stroke is at least one quarter of the nozzle orifice diameter.

At the end face of the magnetic core facing the air gap, there is preferably secured a plate of non-magnetisable material. In this way, one ensures that the magnet armature is not held to the magnetic core under residual magnetism (remanence) when the resetting spring returns the valve plate and magnet armature to the closed position when the magnet coil is switched off.

At the side remote from the valve seat or valve seats, the valve plate may comprise a projection which surrounds the valve shank and projects into the resetting spring. In this way, the resetting spring is guided by the projection, which is preferably conical. The resetting spring will press the valve plate against the step in the bushing and thereby moves the valve shaft so that the valve plate lies against the valve seat or seats when the magnet coil is switched off.

Preferred examples of the invention and developments thereof will now be described in more detail. In the drawings:

FIG. 2 is a plan view on to the valve plate of the magnetic valve according to FIG. 1, FIG. 3 is the section III—III in FIG. 2, FIG. 4 is the section IV—IV in FIG. 2, and FIG. 5 is a plan view on an annular plate of resilient metal embedded in elastic plastics material of the valve plate according to FIGS. 2 to 4.

Figure 1:
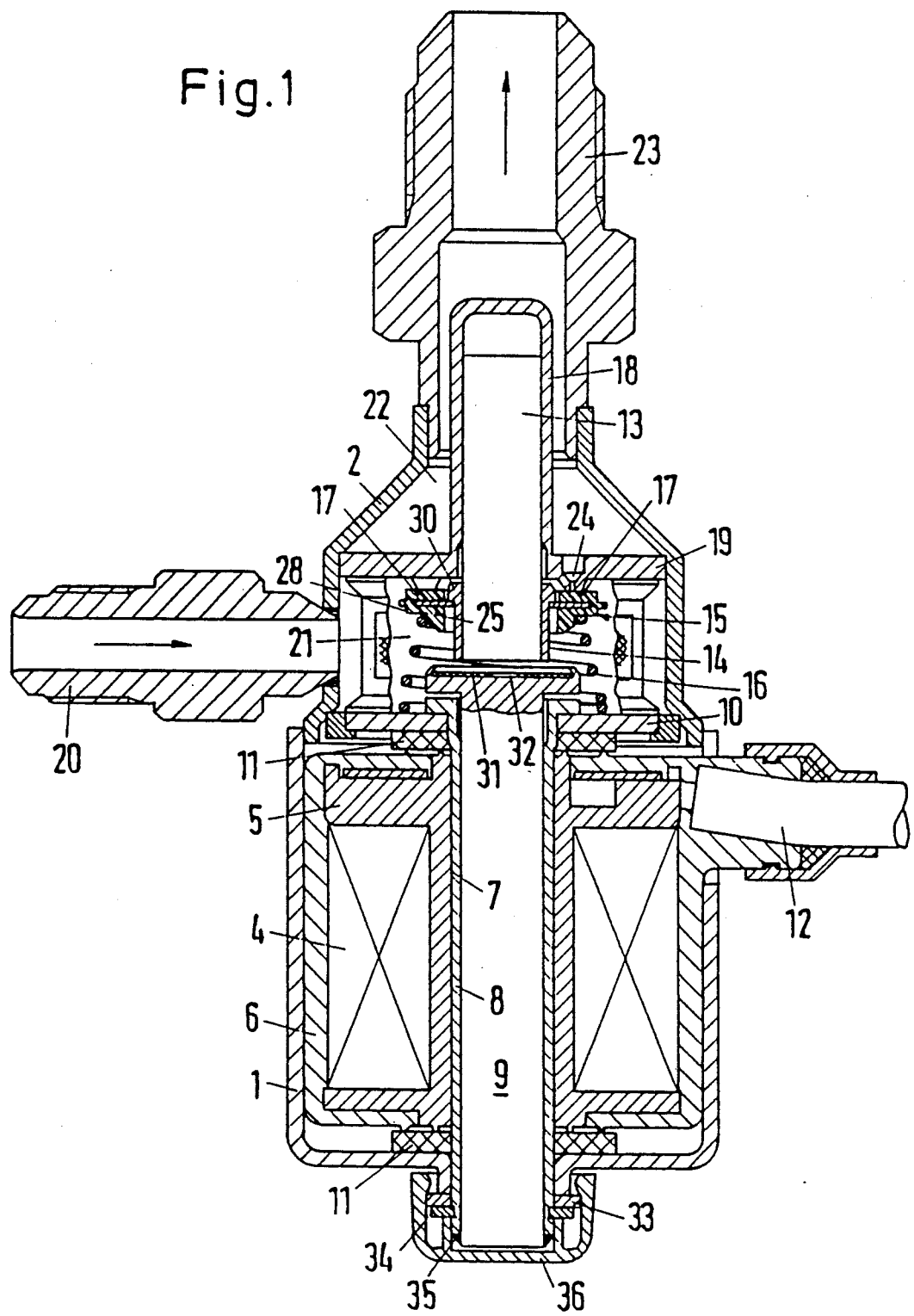
FIG. 1 is a sectional view of a magnetic valve according to the invention.

The magnetic valve of FIG. 1 comprises a housing having magnetically conductive co-axial housing portions 1 and 2 which are sealed to each other. In the housing portion 1, there is an electromagnet with a magnet coil 4, a coil carrier 5 receiving the magnet coil 4, a wall 6 surrounding the coil, a tube 8 disposed in an axial central bore 7 of the coil carrier 5, a rod-shaped magnetic core 9 inserted in the tube 8, an annular plate 10 surrounding the tube 8 and closing off the housing portion 1, and two sealing plates 11 which seal the gap between the coil carrier 5 and wall 6. Current supply or excitation of the electromagnet takes place through a cable 12 which is led out laterally from the wall 6 and housing portion 1. The electromagnet further comprises a rod-like valve shaft 13 which at the same time forms a magnet armature and a damping piston. The valve shaft 13 is co-axial with the magnetic core 9 and separated therefrom by an air gap. Its end section facing the magnetic core 9 is surrounded by a bushing 14 which is fixed thereon and is itself surrounded by a valve plate 15. The valve plate 15 is pushed against the valve seat 17 by a conical resetting spring 16 supported at one side by way of the annular plate 10 at the housing and on the other side at the valve plate 15. The other end section of the valve shaft 13 forms the damping piston which projects into a damping cylinder 18 having an annular flange 19 which projects radially from its mouth. The annular flange 19 separates an inner chamber 21, which is connected to an inlet connector 20, from an outlet chamber 22 which is connected to an outlet connector 23, the damping cylinder 18 projecting into the outlet chamber 22.

The valve seats 17 are disposed in the inlet chamber 21 at uniform angular spacings about the valve shaft 13 and each traversed by a nozzle 24, the inlet and outlet chambers 21 and 22 being interconnected by way of the nozzles 24 when the valve plate 15 is lifted off the valve seats 17 under the force of the electromagnet.

The valve plate 15 is made separately from the valve shaft 13 and contains a very thin annular plate 25 of about 0.25 mm in thickness (see especially FIG. 5) made from resilient metal, particularly spring steel, having six teeth 26 projecting radially from the inner edge of the annular plate and six teeth 27 projecting radially from the outer edge of the annular plate 25. The teeth 26 and 27 are arranged at equal angular spacings and alternate circumferentially with a spacing between successive inner and outer teeth. The annular plate 25 has a coating 28 of elastic plastics material with a base thickness of about 1 mm and an axial annular projection 29 sprayed on to leave at least part of the teeth 26, 27 exposed. The projection 29 extends into the resetting spring 16 to guide same and is externally conically chamfered at its free end for introduction into the resetting spring 16. The teeth 26 and 27 only partially project radially from the coating 28.

The elastic plastics material has a Shore-D hardness of about 40 to 63. A thermoplastic polymer is suitable, preferably a thermoplastic elastomer. A thermoplastic polyester would also be suitable. Chloroprene rubber is preferably employed.

By way of the radial inner teeth 26, the valve plate is supported under the pressure of the resetting spring 16 against an abutment face of a step 30 of the bushing 14, the abutment face being remote from the valve seats. In this way, the forces exerted during opening and closing of the valve are substantially transmitted by way of the radial inner teeth 26. At the same time, the valve plate 15 can turn about any desired transverse axes of the valve shaft 13 and in this way lie against the valve seat 17 over a large area.

At the end face of the magnetic core 9 facing the air gap, a plate 31 of non-magnetisable material is secured by beading in. At the middle, the plate 31 has a hole 32 through which any vapor that is occluded between the plate 31 and the magnetic core 9 can escape. The plate 31 ensures that any residual magnetism (remanence) in the magnetic core 9 after switching the magnet coil 4 off will not markedly hinder the closing movement of the valve shank 13 and valve plate 15 brought about by the resetting spring 16.

The axial position of the magnetic core 9 and hence the airgap width can be set accurately. For this purpose, with the magnet coil 4 switched off and thus with the valve plate 15 held by the resetting spring 16 against the valve seats 17 in the illustrated position, the valve plate which is initially displaceable in the tube 8 secured in its axial position relatively to the housing portion 1 and to the coil carrier 5 by securing rings 33 and 34 is pressed against the valve shank 13 until the bushing 30 shrunk on to the valve shaft 13 lies at the mouth of the damping cylinder 18. Subsequently, the magnetic core 9 is pulled out of the tube 8 in the opposite direction by the desired gap width and soldered to the metal tube 8 as is indicated by the seam 35 of solder. The projecting ends of the tube 8 and magnetic core 9 are then covered by a protective hood 36. This accurate setting of the airgap has the advantage that equal opening and closing times are achieved and the magnetic core 4 is utilized to a maximum.

The illustrated magnetic valve is employed as an expansion valve for readily volatile liquids, especially in refrigeration plant. With the magnetic coil 4 switched on and consequently with the valve plate 15 lifted off the valve seats 17 by the magnetic coil 13 by way of the bushing 30 against the force of the resetting spring 16, the liquid to be vaporized is allowed to pass out of the inlet chamber 21 through the nozzles 24 into the outlet chamber 22 and from there by way of the outlet connector 23 to the refrigeration plant. During expansion in the outlet chamber 22, the refrigerant evaporates and also cools the damping cylinder 18 and the liquid that has reached the damping chamber of the damping cylinder 18 through an annular gap between the valve shaft 13 and damping cylinder 18, so that the liquid in the damping chamber of the damping cylinder 18 will not evaporate despite enlargement of the volume of the damping chamber when the magnet armature 13 is attracted to the magnetic core 9 and the damping effect of the damping piston and damping cylinder 18 are not detrimentally influenced.

I claim:

1. A magnetic valve comprising a valve housing, first means for dividing the housing into an inlet chamber and an outlet chamber and defining at least one valve seat for fluidly connecting the first chamber to the second chamber, an electromagnet in the housing and operable between an energized and a deenergized condition for forming a magnetic field, the electromagnet including an energizable magnetic coil and an axially extending valve shaft axially movable by the magnetic field from a first position to a second position relative to the coil when the electromagnet is energized, the shaft being made of a magnetic material, an annular valve plate member in surrounding relationship to the shaft, abuttable against the valve seat for blocking fluid flow therethrough and axially movable relative to the shaft, second means mounted on the shaft for movement therewith for acting against the valve plate member to move the plate member relative to the valve seat to permit fluid flow through the seat when the shaft is in its second position, and a resetting spring acting against the plate member for resiliently retaining the plate member in abutting relationship to the valve seat to block fluid flow through the valve seat and therethrough resiliently retain the shaft in the shaft first position, the annular valve plate member comprising an annular valve plate made of resilient metal and having an annular inner edge, and a first plurality of angularly spaced teeth joined to the annular inner edge to extend radially inwardly thereof, and an elastic plastic coating joined to at least the valve plate of the valve member, the teeth having at least partially uncoated parts.

2. A magnetic valve according to claim 1, wherein the annular plate has an annular outer edge and a plurality of angularly spaced second teeth joined to the annular outer edge to extend radially outwardly thereof in circumferentially offset relationship to the first teeth, the second teeth having at least partial uncoated portions.

3. A magnetic valve according to claim 1, wherein the first means includes at least a second valve seat angularly spaced from the first valve seat.

4. A magnetic valve according to claim 1, wherein the valve member has a side axial opposite from the valve seat, the valve member side having an annular projection surrounding the shaft and extending into the resetting spring.

5. A magnetic valve according to claim 1, wherein the electromagnet includes a magnetic core surrounded by the coil and axially adjustable relative to the coil, the core and shaft having adjacent end faces and when the electromagnetic is deenergized, the end faces are axially spaced to provide an air gap.

6. A magnetic valve according to claim 1, wherein the core comprises a magnetic core member and the core end face comprises a non-magnetic end plate secured to the core member to facilitate the resetting spring moving the shank toward the shank first position upon deenergizing the electromagnet.

7. A magnetic valve according to claim 1, wherein the valve plate member has a radial inner section and the second means comprises a bushing secured to the valve shank in surrounding relationship to the shank, the bushing including a step having an abutment face remote from the valve seat for abutting against inner section and being radial offset from the valve seat.

8. A magnetic valve according to claim 7, wherein the valve shank has a first end portion adjacent to the coil and a second end portion axially opposite the shank first end portion, the bushing is secured to the shank first end portion, and the first means includes means forming a damping cylinder remote from coil and the shank second end portion extends into the damping cylinder to define a damping piston.

9. A magnetic valve according to claim 8, wherein the damping cylinder has a mouth portion opening to the first chamber and the first means includes an annular flange extending radially outwardly of the mouth portion, the flange having a nozzle opening to the valve seat.

10. A magnetic valve according to claim 8, wherein the first means includes a plurality of valve seats in addition to the first mentioned valve seat, the valve seats being in uniform angular spacing about the valve shaft to open to the elastic coating when the valve plate member is in fluid blocking relationship to the valve seat.

* * * * *